United States Patent [19]
Shogren

[11] 3,832,057
[45] Aug. 27, 1974

[54] SCANNING APPARATUS

[75] Inventor: David K. Shogren, Ontario, N.Y.

[73] Assignee: Xerox Corporation, Stamford, Conn.

[22] Filed: June 2, 1972

[21] Appl. No.: 259,181

[52] U.S. Cl............................. 355/8, 355/65, 355/66
[51] Int. Cl................................................ G03g 15/04
[58] Field of Search..................... 355/8, 65, 66, 49

[56] References Cited
UNITED STATES PATENTS

| | | | |
|---|---|---|---|
| 2,234,717 | 3/1941 | Altman et al. | 355/49 |
| 2,478,555 | 8/1949 | Yiele | 355/49 |
| 3,431,053 | 3/1969 | Wick et al. | 355/66 |
| 3,535,037 | 10/1970 | Koizumi | 355/57 |
| 3,543,290 | 11/1970 | Koizumi | 355/66 X |
| 3,545,857 | 12/1970 | Koizumi | 355/57 |
| 3,609,024 | 9/1971 | Suzuki | 355/66 X |
| 3,609,037 | 9/1971 | Suzuki | 355/66 |
| 3,612,679 | 10/1971 | Punnett et al. | 355/8 |
| 3,614,222 | 10/1971 | Post et al. | 355/8 |
| 3,649,126 | 3/1972 | Koizumi | 355/8 |
| 3,652,156 | 3/1972 | Lahr | 355/8 |
| 3,709,602 | 1/1973 | Satomi | 355/49 |
| 3,720,466 | 3/1973 | Koizumi | 355/8 |

Primary Examiner—Samuel S. Matthews
Assistant Examiner—E. M. O'Connor
Attorney, Agent, or Firm—J. J. Ralabate; T. J. Wall; P. Weinstein

[57] ABSTRACT

Apparatus is herein disclosed for compressing the optics of a scanning system for producing a flowing light image of a stationary original. A scanning mirror is arranged to sweep past the stationary original at a predetermined rate to create a series of incremental images thereof. A stationary half lens is positioned below the scanning mirror in the start of scan position and is arranged to redirect received light back in the direction of scan. A second compensating mirror is moved in cooperation with the scanning mirror which continually redirects the reflected light rays from the scanning mirror back to the lens along the lens receiving optical axis.

14 Claims, 2 Drawing Figures

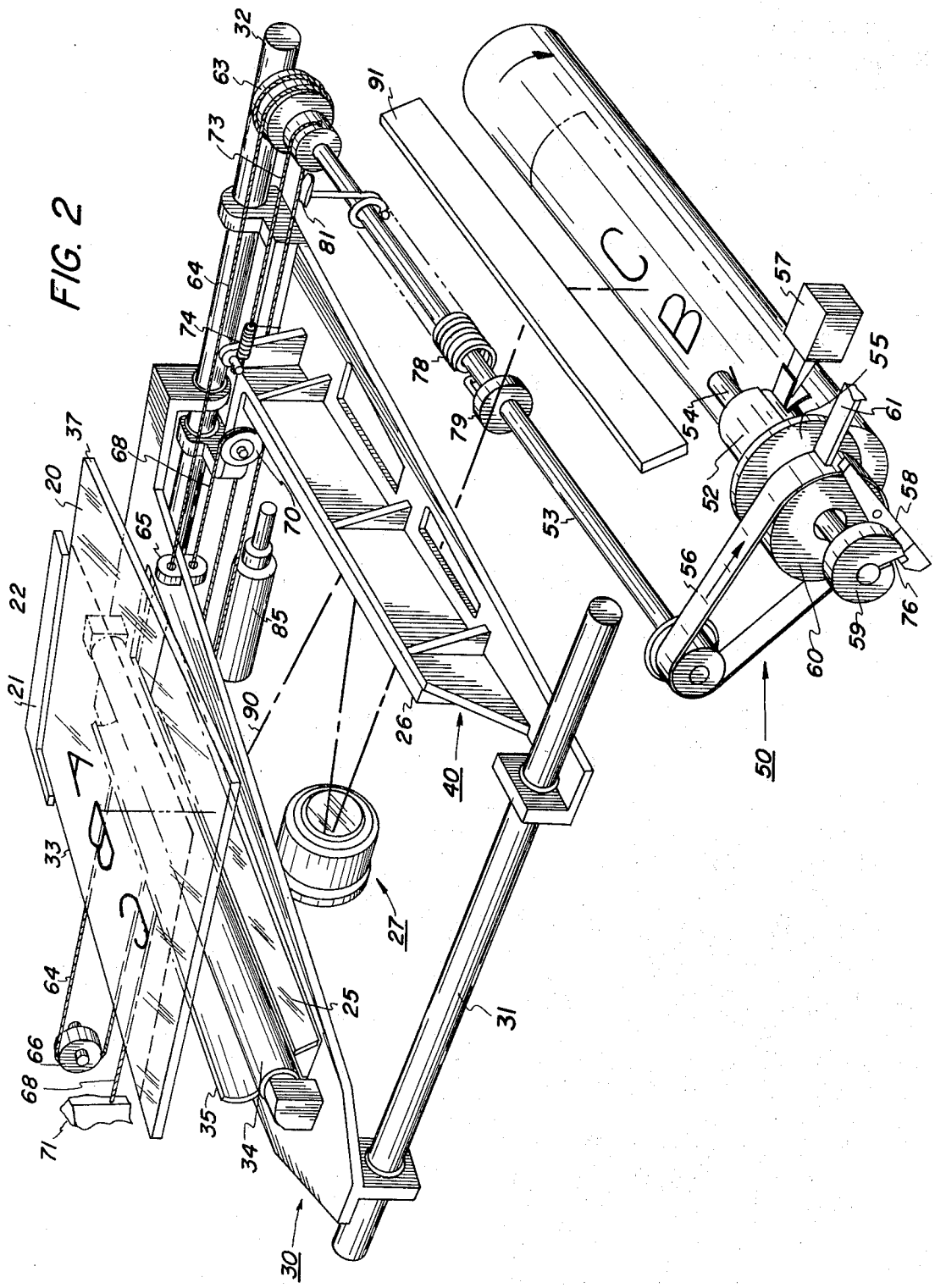

SCANNING APPARATUS

This invention relates to a compressed optical scanning device and, in particular, to compact scanning apparatus suitable for use in an automatic copying machine.

More specifically, this invention relates to a compact copier capable of recording a flowing light image of a stationary original upon a moving photosensitive plate such as a rotatable xerographic drum or the like. Mayo in U.S. Pat. No. 3,062,109 discloses a xerographic machine in which the original subject matter to be copied is supported upon a flat horizontal viewing platen and a moving lens system employed to record a one to one image of the original input scene information on a moving photoconductor. This arrangement allowed for the convenient and safe copying of materials, particularly books and other types of bulky items, and permitted the user freedom to photocompose information at the input station of the machine. Although the Mayo device offered a great many advantages, the moving lens system, because of its inherent limitations, required that the overall machine configuration be relatively large.

Efforts have been made to produce more compact copiers while preserving the advantages found in holding the original in a stationary condition. Wicks, in U.S. Pat. No. 3,431,053, and Jakobson, in U.S. Pat. No. 3,331,181 exemplify these efforts. In both Wicks and Jakobson, a stationary lens system is used and scanning is accomplished by means of a pair of cooperating moving mirrors arranged to fold the optics in a horizontal direction thus compressing the system vertically. However, in both of these devices, vertical compression is only accomplished through horizontal expansion. Because of the many limitations found in these systems, both in regard to the type of lens used and the positioning of the lens, much of the space saved in a vertical sense is surrendered by exploding the system in a horizontal direction.

It is therefore an object of the present invention to compress optical scanning apparatus for creating a flowing light image from a stationary original.

A further object of the present invention is to provide means for compacting a copying device while, simultaneously therewith, providing means for producing a high fidelity one to one copy.

A still further object of the present invention is to improve scanning apparatus for use in compact copiers.

These and other objects of the present invention are attained by means of a stationary viewing platen being arranged to support an original to be copied within a substantially horizontal plane, a scanning mirror arranged to sweep horizontally across the platen from one margin thereof towards the opposite margin at a constant velocity to scan successive incremental areas on the original supported upon the platen, a half lens objective positioned close to or in the plane of the start of scan platen margin and being capable of receiving entering light rays from the platen side of the margin and redirecting the received light rays back once again towards the platen side of the margin, and a second moving mirror positioned ahead of the first scanning mirror in the direction of scan and being arranged to move in coordination therewith so as to redirect each of the reflected light rays eminating from the scanning mirror back towards the objective lens along a common optical axis whereby a constant conjugate length is maintained between the object plane of the system and the stationary lens.

For a better understanding of the present invention as well as other objects and further features thereof, reference is had to the following detailed description of the invention to be read in connection with the accompanying drawings wherein:

FIG. 2 is a perspective view in partial section with portions broken away illustrating the scanning mechanism of the present invention.

Figure 1:
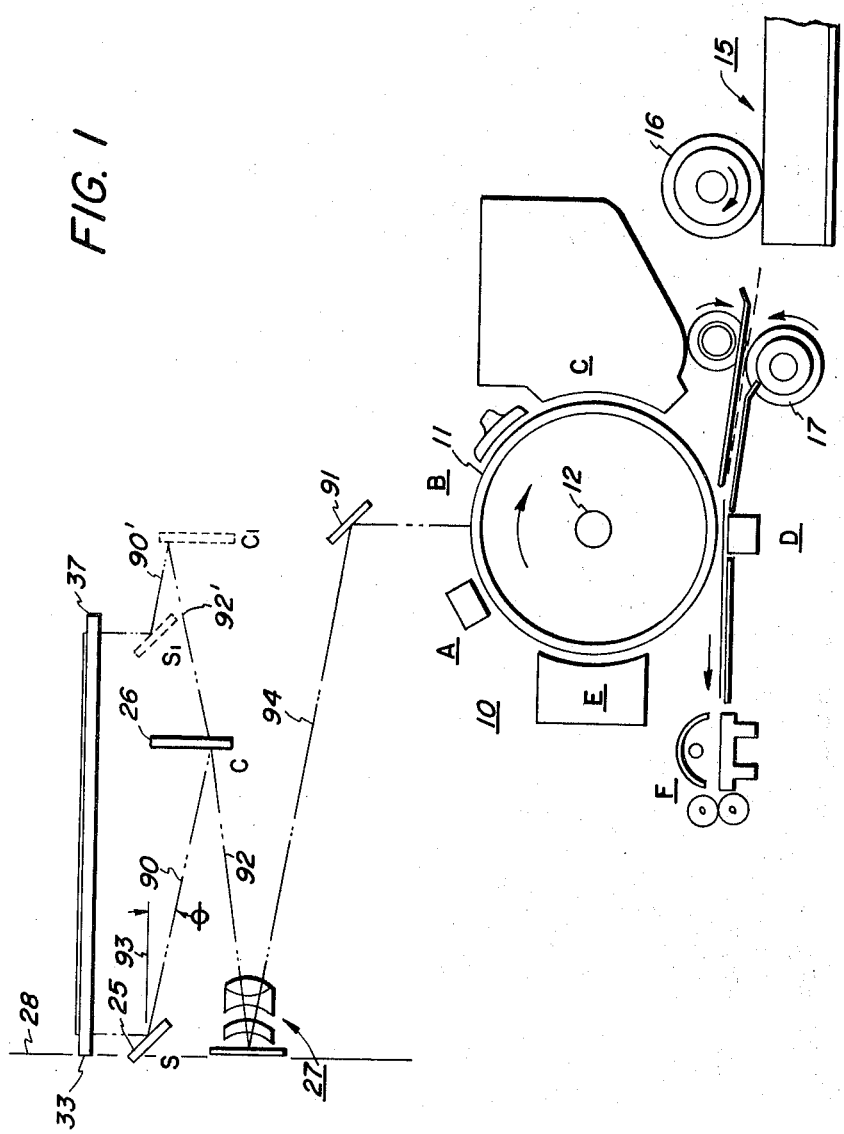
FIG. 1 represents a schematic view of an automatic xerographic reproducing machine embodying the scanning apparatus of the present invention.

Although the apparatus of the present invention is extremely well suited for use in a wide range of copying devices, it is herein disclosed for explanatory purposes in reference to the xerographic process for producing a 1 to 1 reproduction of an original.

As illustrated in FIG. 1, there is shown an automatic xerographic reproducing machine incorporating an optical scanning device incorporating the teachings of the present invention. The copying machine illustrated employs an image recording drum like member 10 which comprises a moving photosensitive plate having an outer surface thereon which is coated with a suitable photoconductive material 11. Such materials as selenium and the like are well known and used in the art for recording latent electrostatic images of an original in the manner herein described. The drum, which is journaled for rotation within the machine frame by means of a shaft 12, rotates in the direction indicated to bring the photoconductive image recording surface thereon past a plurality of xerographic processing stations. Although not shown, it should be understood that suitable drive means are provided to both power and coordinate the movement of the various machine components whereby a faithful rendition of the original input scene information is produced.

Since the practice of xerography is well known in the art, the various processing stations for producing a copy of an original are herein represented in FIG. 1 as blocks A–E. At station A, an electrostatic charge is placed uniformly over the surface of the moving photoconductive drum surface preparatory to receiving the light image of an original to be reproduced. The charged drum surface is then moved through an exposure station B containing the scanning apparatus embodying the teachings of the present invention. Herein a flowing light image of the original is recorded on the plate in a manner to be described in greater detail below. As a result of this imaging operation the charge of a drum surface is selectively dissipated in the light exposed region thereby recording the original input scene information on the photoconductive plate surface in the form of a latent electrostatic image. Next, in the direction of drum rotation, the image bearing plate surface is transported through a development station C wherein the toner material is applied to the charged surface thereby rendering the latent electrostatic image visible. The now developed image is brought into contact with a sheet of final support material, such as paper or the like, within a transfer station D wherein the toner image is electrostatically attracted from the photoconductive plate surface to the contacting side of the support sheet. Finally, any residual toner particles remaining behind on the drum surface after the completion of the transfer operation are cleaned therefrom within a cleaning station E thus placing the photoconductive plate in a condition to be once again reused in the described recording process.

It is herein contemplated that the sheets of final support material processed in this automatic xerographic device will be stored within the machine frame by means of a removal cassette 15. It is further contemplated that the automatic reproducing machine will have a capability of accepting and processing copy sheets of various lengths, the lengths of the sheet selected being dictated by the size of the original input scene information to be recorded on the photoconductive drum. In operation, the individual sheets of support material are separated from the stack and forwarded into the transfer station D in synchronous moving relation with a developed xerogrphic image thereon by means of feed rollers 16 and a sheet registering device 17. The feed roller acts to separate the uppermost sheet from the stack and advances the sheet into the registration mechanism 17. Here, the motion of the leading edge of the sheet is momentarily interrupted while the sheet is properly aligned and registered with the image on the drum surface. The registration mechanism then advances the sheet into the transfer station D where the image is placed upon the copy sheet.

Upon the completion of the transfer operation, the image bearing support sheet is forwarded to a xerographic fusing station F via a conventional vacuum belt transfer means or the like. In the fusing station, the xerographic toner image is heated to a temperature sufficient to fix the toner to the support sheet thus forming a permanent record of the original input scene information. Although any number of well known techniques can be employed to produce the desired image fixing, a radiant fuser is employed herein.

Referring now more specifically to FIG. 2, there is shown in greater detail the scanning apparatus of the present invention. The present apparatus is adapted to place a flowing light image of a stationary original supported upon the planar viewing platen 20 upon the photoconductive surface of the moving drum 10. The platen is preferably constructed of flat optically clear glass that is mounted within the machine frame to provide a horizontal viewing station capable of conveniently holding a wide variety of original material in a stationary condition during the copying process. As can be seen, this type of viewing platen is extremely well suited for supporting books and any other irregular objects as well as providing a support upon which a composite made up of many different inputs can be conveniently composed. A guide member 21, extending along two of the platen margins, is provided to aid in the positioning of a document upon the support surface. A flat original 22, such as a legal size document, is shown in FIG. 2 positioned upon the platen in contact with the guide member.

Scanning of the stationary original is accomplished by means of a first scanning mirror 25, a second compensating mirror 26 and a stationary objective lens element 27. The scanning mirror is supported upon a carriage 30 and the carriages adapted to move back and forth over a prescribed horizontal path of travel below the platen surfaces. To this end, the carriage is slidably mounted upon two parallel aligned guide rails 31, 32 by means of three bearings (not shown). The scanning mirror 25, as positioned upon the carriage, extends transversely across the platen surface in substantially parallel alignment with the platen start of scan margin 33. Mounted directly behind the scanning mirror on the carriage is an aperture lamp 34 and a reflector 35 which cooperate to illuminate a longitudinally extending incremental area upon the platen within the viewing domain of the scanning mirror. As will be explained in greater detail below, the carriage is adapted to move across the lower surface of the platen at a constant rate whereby the mirror 25 scans successive illuminated incremental areas on the platen beginning at the start of scan margins 33 and terminating at the opposite side of the platen at the end of scan margin 37.

A second movable carriage 40 is also provided upon which is supported the compensating mirror 26. The second carriage is also slidably mounted upon the guide rail 31, 32 by means of three bearings housed within individual support mounts. The support mounts of carriage 30 are arranged to move in non-interferring relationship with the support mounts carriage 40 throughout the scanning operation. Compensating mirror 26 is positioned on the carriage 40 to receive reflected light rays eminating from the scanning mirror and redirecting these light rays back towards the stationary lens element 27.

Although any suitable lens can be employed herein, a half lens system comprised of a two component split Dagor system is preferred. The lens is mounted in a stationary position within the boundaries described by the platen margins close to the vertical plane 28 in which the start of scan margin is located. The light entrance face of the lens is positioned so as to receive light rays directed thereto from the end of scan margin 37. A reflecting surface is positioned at the lens stop position to reverse the received light rays as they pass through the lens components thus simulating a conventional symmetrical system. The lens system is basically an off axis objective which collects light from one side of the central axis and forms the image on the opposite side of the axis. For a more detailed description and further features of this type of lens, reference is had to U.S. Pat. No. 3,659,922 issued in the name of McCrobie.

As illustrated in FIG. 2, a pulley and cable drive system is herein provided to coordinate the movement of the scanning mirror carriage 30 and the compensating mirror carriage 40. The optics are driven via the optics drive shaft 53, the motion of which is regulated by a control mechanism generally referenced 50. A gear 55 is operatively connected to the rotating xerographic drum 10 and is arranged to rotate at a predetermined rate therewith. The motion of the gear is imparted to drive shaft 54 through a wrap around clutch 52, the action of which is regulated by a solenoid 57. Affixed to the outboard end of the drive shaft 54 is a cam element 59 having a stop face 76 formed therein. A pawl 58 is pinned to drive pulley 60, which is mounted for free rotation upon the drive shaft 54, and is adapted to periodically translate the motion of the shaft to the pulley.

In operation, at the initiation of a copying cycle, the scanning mirror and the compensating mirror are both in their respective home positions and the wrap around clutch is disengaged. To start a copying sequence, solenoid 57 is energized pulling a latch (not shown) energizing the wrap around clutch. This, in turn, causes the shaft 54 to rotate in the direction indicated in timed relation with drum 10. The motion of the shaft 54 is imparted to the pulley 60 via cam 59 and pawl 58, which is engaging stop face 76, and translated to the optics drive shaft by means of a timing belt 56.

A two drum pulley 63 is rigidly affixed to the outboard end of the optics drive shaft 53 and adapted to turn with the shaft. A main drive cable 64 is wrapped about the large diameter drum of the pulley with one end of the cable anchored in the forward end of carriage 30 by means of an adapter 65 and the opposite end of the cable passed about a reversing pulley 66 and being similarly secured in the back end of the same carriage. This particular arrangement makes the scanning carriage a part of the endless loop cable system whereby the carriage responds instantaneously and positively to any movement of the optic drive shaft.

In this particular embodiment of the instant invention, the movement of the compensating mirror carriage 40 is coordinated with that of the scanning mirror carriage by means of a control cable 68. As illustrated in FIG. 2, one end of the control cable is anchored in the forward end of the scanning carriage by means of the adapter 65 and is passed around an idler pulley 70, journaled for rotation in the rear portion of carriage 40, and affixed to the machine frame 71. As can be seen, the compensating mirror carriage 40 is continuously repositioned in regard to the scanning mirror carriage by the control cable as the scanning mirror is driven through the copying cycle. Although a control cable arrangement is herein employed to coordinate the movement of the two mirrors, it should be clear to one skilled in the art that anyone of a wide variety of mechanical devices can be similarly employed to accomplish this desired result without departing from the teachings of the present invention. In practice, the rate of the scanning mirror is set equal to the peripheral speed of the xerographic drum and the motion of the compensating mirror regulated in respect thereto so as to present a flowing light image of the original at the photoreceptor surface.

An auxiliary drive cable 73 is also provided to aid in transporting the compensating mirror carriage throughout the scanning phase of each copying cycle. One end of the cable is secured to the smaller drum of the pulley 63 and the opposite end of the cable tied to the compensating mirror carriage by an extension spring 74. As the optics drive shaft is rotated in a clockwise direction (FIG. 2) the cable 73 is wound upon the smaller drum of the pulley pulling the mirror carriage from its home position towards the platen end of scan margin 37. Sufficient play is provided by the spring to allow the control cable 68 to act as the predominant control mechanism within the system while still enabling the drive pulley 63 to aid in the movement of the carriage. Alternatively, the flyback cable 68 can be removed from the system and cable 73 connected in an endless loop arrangement similar to cable 64 to the compensating mirror carriage. In this manner, the continuous repositioning of the two mirrors can be programmed by controlling the diameter ratio between the large drum and the small drum of pulley 63.

In the preferred embodiment of the present invention, rotation of the cam 59 through approximately 319° will provide a sufficient angular displacement of the optics drive shaft to move the scanning mirror and the compensating mirror through the entire scanning phase of the copy cycle. That is, the scanning mirror and the compensating mirror will have been moved from position S and C, respectively to positions $S_1$ and $C_1$ as shown in FIG. 1. At the 319° mark, the pawl 58 contacts a striker bar 61 which disengages the pawl from stop face 76 thus freeing the drive pulley 60 and, as a consequence, the optics drive shaft 53 from the input drive mechanism. At this time, the wrap around clutch is still engaged and continues to turn the cam 59 through a full 360° of rotation preparatory to the initiation of the next subsequent copying cycle. The release of the optics drive shaft from the main drive begins the mirror restoration phase of the copying cycle.

A wind up spring 78 is wrapped about the optics drive shaft 53 in the manner illustrated in FIG. 2. One end of the spring is locked to the shaft by means of a retainer 79 while the other end of the spring is secured in the machine frame 81. As the shaft is rotated in a clockwise direction during the scanning phase, the spring is wound to a fully loaded condition. At the 319° mark, when the drive pulley is released, the loaded spring is permitted to unwind turning the optics drive shaft in an opposite or counter clockwise direction. This, in turn, causes the two mirror carriages to move back over the guide rails toward their start of scan or home positions. In order to conserve valuable machine time, mirror restoration is accomplished in a minimum amount of time, preferably within a time period that is considerably shorter than the scanning period.

A dashpot 85 is provided to control the motion of the two carriages during the final portion of the restoration phase of the copying cycle. The dashpot is arranged to physically engage the scanning mirror carriage as it approches the home position and serves to decelerate the carriage, and thus the entire system under conditions thereby preventing the optics from being disturbed or damaged.

As clearly illustrated in FIG. 1, at the beginning of each copying cycle the scanning mirror is in a home position S wherein the mirror is capable of viewing an extended incremental area on the platen including the start of scan margin 33. As the mirror 25 sweeps across the bottom surface of the platen towards the end of scan position, a continuous series of incremental areas upon the platen are scanned. The light rays of these scanned areas are reflected by the scanning mirror back toward the compensating mirror along an optical light path 90. Because of the positioning of the scanning mirror, all of these reflected light paths will be parallel with each other and at some angle $\theta$ with the path travel 93 of the mirror carriage, which in this case is substantially the horizontal plane. As the scanning mirror moves from one viewing position to the next, the reflected light path is shifted correspondingly. This, of course, necessitates a continuous repositioning of the compensating mirror. To this end, the repositioning of the compensating mirror is controlled through the cable system whereby each of the reflected light rays eminating from the scanning mirror is redirected by the compensating mirror back towards the lens along a common optical axis representing the light receiving axis 92 of the lens system. The image created by the lens is subsequently directed back along optical axis 94 and focused upon the drum via mirror 91.

When the scanning mirror is in the home position, the optical distance between the object plane view at the platen and the drum surface is the conjugate distance of the system. This being a 1 to 1 magnification system, the lens is positioned at a mid-point along the optical centerline. However, as the scanning mirror moves across the platen, the position of the object plane is continually moving in respect to the stationary lens. By regulating the repositioning of the compensating mirror in respect to scanning mirror so that the redirected light rays from the compensating mirror coincide with the light receiving optical axis 92 of the lens, the conjugate length of the system will remain constant throughout the scanning pass. Because the scanning mirror is being moved at the same speed as the drum, a flowing light image is focused on its surface which is recorded thereon in a clear undistorted manner. It should be clear to one skilled in the art, that other magnification can also be obtained with the present system without departing from the teachings of the invention by appropriate adjustment of the lens conjugate and speed ratio between the scanning mirror and drum surface.

While this invention has been described with reference to the structure disclosed herein, it is not confined to the details set forth and this application is intended to cover such modifications or changes as may come within the scope of the following claims.

What is claimed is:

1. Apparatus for optically scanning a stationary original and creating a flowing light image of the original including:

a stationary viewing platen for supporting an original in a plane, said platen defining a first side margin boundary and an opposing side margin boundary;

a stationary half lens system having a central lens axis, comprising an objective which collects light from one side of the central lens axis along a light receiving axis, and forms the image on the opposite side of the central lens axis, and a reflecting surface positioned at the lens stop position to reverse received light, said lens system being positioned to collect said light from the platen side of said first margin boundary and redirect said light back again toward the platen side of said first margin boundary, a first reflecting element arranged to move along a path of travel parallel to said plane between said first side margin boundary and said opposing side margin boundary, whereby successive incremental areas of the original are scanned and reflected along a series of light paths that are parallel to each other and angularly displaced from said path of travel; and a second reflecting element arranged to move in coordination with said first reflecting element along a path of travel parallel to said plane so as to receive each of said reflected light paths from said first element and redirect said light paths toward said lens system along the light receiving axis of said lens system;

whereby a flowing light image of the image is created in the image plane of said lens system.

2. The apparatus of claim 1 wherein means are provided for moving said first reflecting element over its path of travel at a uniform rate.

3. The apparatus of claim 2 further including means to restore said first and second reflecting elements to a start of scan condition upon the completion of said optical scanning of the original.

4. The apparatus of claim 3 wherein means are provided for restoring said first and second reflecting elements to a start of scan condition at a rate that is greater than the scanning rate.

5. The apparatus of claim 4 wherein said half lens system is supported below said platen at said first side margin boundary.

6. The apparatus as in claim 5 wherein said first and second reflecting elements are each mounted upon a carriage and wherein said carriages are slideably supported on a common pair of guide rails.

7. The apparatus of claim 1 further including illumination means for illuminating the original supported in said plane and associated with said first reflecting element.

8. The apparatus of claim 7 wherein said illuminating means is supported by the carriage on which said first reflecting element is mounted.

9. In a copying device in which an original to be copied is supported in a stationary condition upon a flat viewing platen and a flowing light image of the original is recorded upon a moving photosensitive plate, said platen defining a first side margin boundary and an opposing side margin boundary, the improvement wherein said copying device includes:

a stationary half lens system having a central lens axis, comprising an objective which collects light from one side of the central lens axis along a light receiving axis, and forms the image on the opposite side of the central lens axis, and a reflecting surface positioned at the lens stop position to reverse received light, said lens system being positioned to collect said light from the platen side of said first margin boundary and redirect said light back again toward the platen side of said first margin boundary;

a moving photosensitive plate positioned in the image plane of said lens system, said plate moving at a uniform rate;

a first planar mirror movably positioned below said platen and being arranged to move at said uniform rate over a path of travel parallel to the plane of said platen between said first side margin boundary and said opposing side margin boundary, whereby successive incremental areas of the original are scanned and reflected along a series of light paths that are parallel to each other and angularly displaced from said path of travel; and a second planar mirror arranged to move in coordination with said first planar mirror along a path of travel parallel to said plane so as to receive each of said reflected light paths from said first planar mirror and redirect said light paths toward said lens system along the light receiving axis of said lens system;

whereby the conjugate length of the system remains constant as the original on the platen is scanned.

10. The apparatus of claim 9 further including a reflecting surface positioned in the light projection axis of the lens system to further compact the copying device.

11. The apparatus of claim 9 wherein said first and second mirrors are each mounted upon a mirror carriage and the mirror carriage slidably supported on a common pair of guide rails.

12. The apparatus of claim 11 wherein said mirror carriage supporting the first mirror further includes a light source for illuminating the original in the viewing domain of the first mirror.

13. The apparatus of claim 11 further including means to restore said mirror carriages to a start of scan position at the completion of a scanning pass at a rate that is greater than the scanning rate.

14. Apparatus for optically scanning a stationary original and creating a flowing light image of the original for projection on a moving member at an image plane;
   a stationary viewing platen for supporting an original in a plane, said platen defining a first side margin boundary and an opposing side margin boundary;
   a first reflecting element arranged to move along a path of travel parallel to said plane between said first side margin boundary and said opposing side margin boundary whereby successive incremental areas of the original are scanned and reflected along a series of light paths that are parallel to each other and angularly displaced from said path of travel;
   a second reflecting element arranged to move in coordination with said first reflecting element along a path of travel parallel to said plane so as to receive each of said reflected light paths from said first element and reflect said light paths; and
   a stationary half lens system having a central lens axis, comprising an objective which collects light from one side of the central lens axis and forms the image on the opposite side of the central lens axis, and a reflecting surface positioned at the lens stop position to reverse received light, said lens system being positioned to receive the reflected light paths from said second reflecting element and redirect said light paths back for projection on said moving member.

* * * * *